United States Patent Office 3,174,325
Patented Mar. 23, 1965

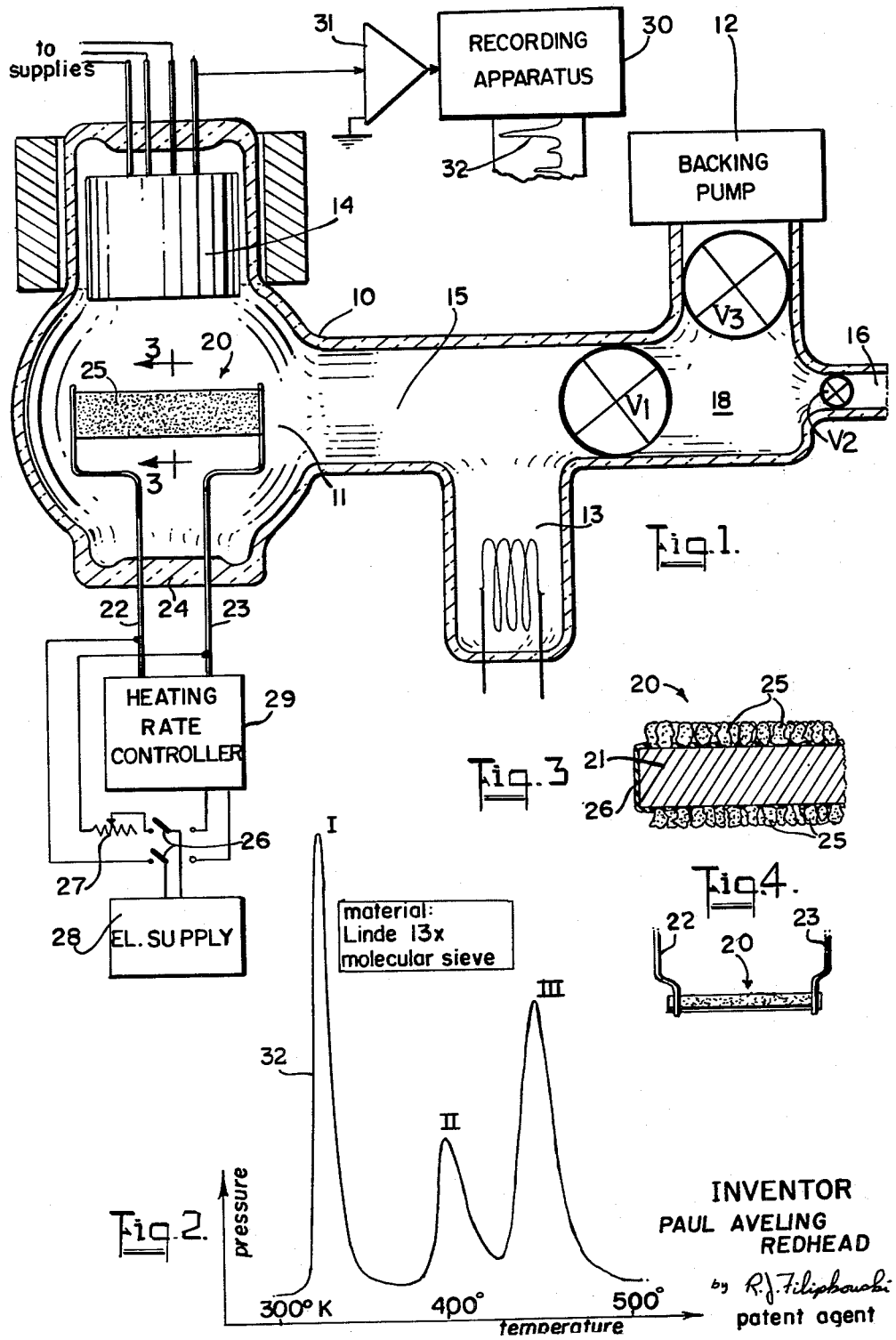

3,174,325
POROUS ADSORBER BODIES FOR USE IN
DESORPTION SPECTROGRAPHY
Paul Aveling Redhead, Ottawa, Ontario, Canada, assignor to National Research Council, Ottawa, Ontario, Canada, a body corporate
Filed Dec. 10, 1962, Ser. No. 243,505
13 Claims. (Cl. 73—23)

This invention concerns improvements in instruments for qualitatively analysing gases, and specifically relates to desorption spectrometer apparatus which detects gases desorbed selectively from the surfaces of a porous solid as its temperature is raised.

Heretofore the analysis by means of a mass spectrometer of a rarefied gas sample has been limited practically to pressures above about $10^{-9}$ mm. Hg. Identification of gas constituents at lower pressures requires apparatus of greatly increased complexity and considerably longer procedures attended by difficulties of amplifying very weak electrical currents.

In my copending application Serial No. 57,533, now Patent No. 3,068,402, I have disclosed and claimed a method and apparatus for analysis of constituents of a gas sample by detecting variation in gas pressure or partial pressure produced in an evacuated space as a result of evolution of adsorbed gases from a non-porous body at characteristic desorption temperatures. The resolution of pressure peaks of evolved gas constituents requires that the body be dense, smooth-surfaced, and substantially free of micropores, and that the amount of any gas present be sufficient to avoid masking by the peak due to a more abundant constituent liberated at nearly the same temperature. While the method described in the patent enables rapid and accurate qualitative analysis of a gas sample to be carried out at very low pressures, the sensitivity of the apparatus is limited due to the very small surface area of the wire or strip desorber body, and the resolution between minor constituents is sometimes impaired due to the small amount of one of them. Metal desorber bodies which have a partly porous structure have been found to produce inaccurate data and to lead to impaired resolution of constituents when used according to the method of the invention described in my patent, and have been avoided.

I have now found that when a desorber body has a completely porous structure, desorption spectrography apparatus employing such body has improved resolving power and possesses higher sensitivity, particularly when the dimensions of the pore cross-sections throughout the body are substantially constant. When the adsorptive surface area of a solid material which exhibits selective desorption phenomena for constituent gases of a surrounding atmosphere is increased by a very large factor, for example by from $10^4$ to $10^6$ or more times the surface area of a metal wire or strip body of the same size, the amounts of gas desorbed are much increased, so that the sensitivity and resolving power of the desorption spectrometer are proportionately higher. Nevertheless, the sweep rate, i.e. the rate of increase of temperature with time, needs to be decreased only by less than two orders of magnitude. It will be apparent therefore that the analysis of gas constituents by measurement of pressure of a gas sample undergoing selective desorption from the improved desorber bodies of the present invention can be made with far greater accuracy.

I have found that when a porous solid such as a zeolite, compacted carbon, certain refractory oxides, or sintered metal powders, supported as a thin layer in intimate heat exchange relation on a suitable metal substrate, within the pore openings or interstices of which porous solids gas constituents of a sample may be adsorbed at sufficiently low temperature, is heated gradually at a controlled rate to a higher temperature, the phenomenon of selective desorption of the constituents over specific ranges of temperature occurs. Identification of constituents of the sample may be made by correlating gas pressure variations with temperature of the substance by prior calibration with known gases.

The present invention therefore seeks to provide an improved apparatus for the identification of constituents of a gaseous mixture at low pressure by the measurement and recording of the variation of gas pressure produced in a vacuum system by release of adsorbed gases from a porous solid substance as its temperature is gradually raised from the cold state while pumping is continued to tend to maintain the system pressure at a stable value.

In carrying the invention into effect a chamber is provided for containing a sample of a rarefied gas or gas mixture, connected to a vacuum pump and an ionization gauge or mass spectrometer, arranged to measure very low total gas pressure or partial gas pressure continuously and connected with recording apparatus, and a porous adsorber solid body in the form of a thin layer supported on a metal substrate is located within the chamber and arranged to have its temperature raised at a controlled rate from an initial low temperature. The mixture of gases including reaction products which have been adsorbed upon the previously cleaned surfaces of the adsorber body while cold are separately desorbed therefrom at characteristic temperatures to produce temporary increases of pressure or partial pressure in the chamber, the released gas being pumped away by the action of an ionization gauge and any auxiliary pump that may be connected with the chamber. The gases producing the peaks in the resulting record may be identified by a calibration record of gas evolution versus adsorber temperature as may be obtained by introducing known gases into a previously cleaned system, as well as by means of a mass spectrometer.

The adsorber body according to the present invention is preferably chosen from those bodies characterized by thermal stability, adequate heat conductivities, and by a large ratio of surface area to absolute volume, i.e., area to mass, which are porous solids formed as layers of limited thickness supported in optimum heat transfer relation with a metal substrate arranged to have its temperature regulated within predetermined limits during an interval of time. In general, the identification of gaseous constituents is feasible when the adsorber substance is a relatively thin film or layer deposited on a metal wire or strip which is either completely covered by the porous solid, or which itself has an insignificant desorptive capacity. The layer of porous solid may be molded to the substrate as a wafer or strip adhered to the substrate, or it may be a deposit of aggregated particles, the interstices or voids therein being substantially freely interconnected. The substrate is preferably arranged to be supplied by a heating current at such a rate that a predetermined variation of temperature with time is obtained during the desorption cycle. The variation may preferably be linear, or may also be according to a non-linear function of time. The initially adsorbed contaminants are removed by prolonged baking at an elevated temperature while pumping is continued at the lowest possible pressure and the substrate being allowed to cool with its adhered layer of porous adsorber, and to remain cold for a measured time while exposed to the rarefied sample introduced into the analysis chamber. The desorption step may be carried out by increasing the substrate temperature at a rate of from about 5 to about 50° C. per minute, with the total or partial pressure gauge, the recording apparatus, and backing pump all operating. The peaks of total or partial pressure recorded on the resulting chart constitute a "spectrum" enabling identifications to be made of constituents of the sample.

A preferred form of combined pump and ionization gauge for use at ultra-high vacuum may take the form of the gauges described in my U.S.A. Patents Nos. 2,937,295 of May 17, 1960, or 3,051,868 of August 28, 1962. Such devices are effective both as high vacuum pumps and total pressure measuring instruments wherein an ion current is derived proportional to pressure down to the lowest limits of measurement technique, operating in the range of pressures between about $10^{-4}$ mm. Hg and $10^{-12}$ mm. Hg, responding rapidly to pressure variations. Various other high vacuum gauges may also be employed provided these have sufficient accuracy at the very low pressures of samples. Alternatively or in conjunction with the total pressure indicating forms of ionization gauges referred to, a partial pressure sensitive ionization device, namely, a mass-spectrometer, may be employed. Throughout this specification such devices will be included by the term "ionization vacuum gauge" which is intended to include devices wherein an ion current is produced proportional either to total pressure of a gas mixture or to the partial pressure of one constituent of the mixture.

The adsorbing porous solid may initially be held at room temperature or at any lower or higher temperature as desired, the rare gases requiring extremely low temperatures of the adsorbing solid to exhibit the desorption phenomenon satisfactorily while active gases desorb generally near room temperature or above.

The principles and practice of the invention may be understood more fully from a reading of the following description of its embodiments and their use, in conjunction with the figures of the accompanying drawings, wherein:

FIGURE 1 is a schematic diagram of a desorption spectrometer system employing an improved adsorber body according to the invention;

FIGURE 2 is a graph showing a spectrum of pressure variations obtained by the apparatus of FIGURE 1 with respect to temperature of the adsorber;

FIGURE 3 is an enlarged cross section of a preferred form of desorber of aggregated particle form supported on a metal substrate, taken on line 3—3 of FIGURE 1; and, FIGURE 4 shows an alternative rod form of desorber body.

Referring to the drawing, the improved desorption spectrometer apparatus of the present invention consists of an envelope 10 surrounding a chamber or vessel space 11 wherein a composite adsorber body generally designated 20 of extremely large adsorptive surface area is mounted. A neck 15 extending from the chamber is connected with a low vacuum packing pump 12 by valves V1 and V3, and is permanently connected with a high vacuum gettering pump 13 and an ionization vacuum gauge 14. A side tube 16 is connected with a source (not shown) of a sample of gas or a gas mixture to be identified as to its constituents, and is also connected with a lateral arm entering the vacuum line 18 between valves V1 and V3 by means of valve V2.

The desorber body 20 preferably is formed as a composite structure having a metal strip core 21 of uniform breadth and thickness supported by its ends from stiff wire leads 22 and 23, the latter being sealed into an end 24 of the envelope 10. The core may be any refractory metal and may be a corrosion-resistant metal having high ohmic resistance per unit length, for example a nickel-chromium alloy, or tungsten. The core strip supports a deposit of porous adsorbing solid granular material of uniformly sized particles 25, adhered to and partly embedded in a thin coating layer 26 bonded to the core strip and bonding the particles thereto in intimate heat exchange contact relation. The coating layer should have an extremely low vapour pressure at any temperature in the range of operating temperatures, and a high degree of thermal stability at elevated temperatures. One suitable material is an epoxy type of polymerized synthetic resin; such material has an uncured fluid phase permitting the metal core strip to be coated, following which a partial cure is effected until the coating is tacky and has a viscosity such that the particles 25 may be adhered thereto and pressed into contact with the core strip, prior to the final curing which sets the resin.

The particles 25 should be substantially uniform in protruding height above the metal substrate, and may be sieved to pass a 200 mesh screen but retained on a slightly finer screen. The basal portions of the particles should be embedded to about one-tenth to one-twientieth of their height in the layer 26, but the resin should not appreciably enter the pores and openings of the particles in order to preserve the highest surface-to-mass ratio. A preferred material is a granular zeolite produced artificially under controlled conditions of manufacture, having substantially uniform void dimensions and being characterized by a relatively open mesh or maze form of foraminate crystals, whose pore openings are inherently present by virtue of the molecular arrangement of the substance and are of relatively constant size. Such materials are commonly termed "molecular sieves" by reason of their capacity to act as filters which will pass molecules of smaller sizes but will not allow larger molecules to pass through.

In one embodiment an artificial zeolite having pore dimensions ranging from about 7 to about 20 Angstrom units (one Angstrom unit being $10^{-8}$ cms.) and predominantly being of 13 Angstrom unit size proved highly successful in gas analyses.

Heating current is provided to the leads 22 and 23 either at a constant value directly through switch 26 and rheostat 27 from a supply 28, or through a variable rate control system 29, the latter being arranged to effect a predetermined rate of heating throughout a heating cycle. For example the control system may be arranged to raise the filament temperature in a typical cycle from about 293° K. to about 520° K. at a mean rate of 45 degrees centigrade per minute although lower and still higher rates may be used.

The initial out-gassing of the system may be performed by closing V2 and opening V1 and V3 to connect pump 12 with the system to exhaust it to backing pressure, and the system heated by radiant heat while pumping is continued. After out-gassing V2 and V1 are closed, and gettering pump 13 is operated until a pressure indication from ion current recorder 30 fed from amplifier 31 is below $10^{-9}$ mm. Hg.

Following the cleaning operations the system is cooled while sealed off, until the parts have reached the desired low temperatures, as may be produced by refrigeration of the envelope 10. A sample of the gas to be analysed is admitted to chamber 16 by opening V2. The valve V1 is then adjusted either to fill the analyser chamber at a relatively high pressure and then closed, or to admit a continuous small flow of the gas or gases at a rate correlated with the pumping speed of the device 14 so that the chamber pressure does not rise above about $10^{-7}$ mm. Hg.

When a sufficiently long interval of time has elapsed to allow the gas molecules to be adsorbed within the voids and pores of the particles 25, as will depend in part on the nature of the gases admitted, the gas pressure, and the cold temperature of the particles, the system is pumped out to bring the remanent gas pressure below about $10^{-7}$ mm. Hg. The temperature of the metal strip 21 is raised gradually according to a predetermined time function, usually several minutes of heating being required to raise the temperature of the composite body 20 to its highest value. The rate of temperature rise will be made as high as the desired resolution of gas pressure peaks will allow to enable accurate qualitative analysis of all constituents present to be made. Obviously too rapid a rise in temperature will spread the peaks and render the resulting record difficult to interpret, since the temperature of all portions of each particle ideally should be substantially uniform. For each body 20 there may be found an optimum heating rate such that adequate peak pressures are generated and sufficiently precise resolution between adjacent peaks is provided.

A typical spectrum obtained with a heating cycle of seven minutes' duration is shown in FIGURE 2, the record trace 32 relating chamber pressure versus temperature of body 20 rising and descending in a number of peaks designated I, II, and III above the initial cold system pressure. These peaks are interpretable as indicating the presence respectively, proceeding in the direction of ascending temperature, of the gases hydrogen, nitrogen, and carbon monoxide.

Because of the greatly increased adsorptive capacity of efficient porous solids such as zeolites as compared with dense metal wire or strip adsorber/desorber bodies, relatively high pumping speeds may be required to restore the chamber pressure to a suitably low value following evolution of a particular gas constituent.

It is characteristic of zeolite compounds that the nature of bonds holding a molecule of a particular gas to the surface of the compound is quite different from that by which the same gas molecule is adsorbed on a metal surface. Consequently the spectra of evolved gases desorbed respectively by a metal and by a zeolite are different. It has been found that whereas two gases may be selectively desorbed at nearly the same temperature from a metal surface, they may be desorbed from a zeolite at widely different temperatures. The separation or resolution between CO and $N_2$ by zeolite desorption spectrography is much more precise than can be achieved with a metal adsorber/desorber.

While the exact mechanism of adsorption and release in a zeolite body of gas molecules is not yet clear, there is some evidence that diffusion processes play a large part and that the migration of gas molecules into and through the voids is influenced by the character of the gas molecules and the dimensions of the voids and passages in the zeolite. Consequently very small differences in dimensions of gas molecules are responsible for large differences in adsorptive capacity and release or evolution of adsorbed molecules. For the common gases such as hydrogen, nitrogen, oxygen, the optimum dimensions of the pores of the adsorber/desorber body are of the order of the atomic dimension of the gas molecule, so that specific zeolite compounds may be chosen with pore dimensions from about 3 to about 20 Angstrom units for their desorption spectography separations. Very much larger pore dimensions are required for certain organic compounds of gasous form whose molecules are much larger, for example, ranging upward of 50 Angstrom units.

The ideal structure is an open lattice or three-dimensional maze, wherein regularly spaced interconnected voids are separated by non-porous solid skeletal framework and the dimensions of the voids and of the interconnecting passages is not significantly less than about 5 Angstroms. The porous solid may be realized otherwise than as an artificial zeolite, with some loss in total adsorptive capacity and hence in sensitivity as well as resolution. Nevertheless porous solids which are aggregates of solid non-porous particles or granules which are themselves a fraction of a micron in size (i.e., from about 200 to 5000 Angstrom units) may be used as an adsorber/desorber body of improved capacity and sensitivity as compared with a dense metal body. In general, a refractory solid in finely divided form is prepared as a thin layer in intimate contact with a metal support base which serves also as a heating means, the thickness of the layer being restricted to such value as will permit all parts of the layer to reach thermal equilibrium with the base when the temperature of the latter is varied at a rate of about 5 to 50° C. per minute. Preferably the layer is formed as a sintered mass, and may advantageously be compacted by pressure applied during the sintering to bond the layer to the substrate and to improve the thermal conductivity of the layer in the direction normal to the surface of the substrate. Amorphous carbon, graphite, certain metal oxides such as aluminum oxide, and finely divided metal may be used to produce a porous solid layer suitable for desorption spectrography. The porosity of such solid, that is to say, the measure of the total volume of voids to the bulk volume, as well as the relative permeability of the solid to flow of gaseous substances therethrough by diffusion processes, differs from layer to layer depending on the nature of the particulate material, the range of particle sizes, and the methods of preparation. It is important that the material from which the solid layer is prepared be pure, since each different material produces a separate desorption spectrum.

An amorphous carbon layer may be produced by carbonization of a solid hydrocarbon, whose destructive distillation yields only volatile compounds and leaves a residue of carbon of exceedingly fine particle size. One suitable material is vinylidene chloride, commonly known by the trade name "Saran." The finely divided carbon residue is sintered under pressure as a layer about 0.1 mm. thick upon a suitable metal substrate, e.g., tungsten, in a non-oxidizing atmosphere or preferably a vacuum. Such porous solid layers may be used over a broad temperature range, and have a total adsorptive capacity up to many tens of thousands of times larger than the capacity of metal substrate alone.

Graphite dispersions of individual particle sizes below about 0.02 micron when fabricated as thin layers may have an adsorptive surface area of the order of $10^6$ square meters per gram.

The substrate on which the porous solid layer is supported may take a variety of geometric forms, for example, it may be a straight cylindrical rod as shown in FIGURE 4. The shape of the desorber body 20 is not restricted otherwise than by the requirement that the substrate 21 be susceptible of uniform heating throughout its length and reasonably rigid.

I claim:

1. Apparatus for the identification of constituents of a gaseous substance comprising an envelope for receiving a sample of said substance, an opening in said envelope for connection with a source of said substance in rarefied form an adsorbing porous solid layer, an electrically conducting metal support for said layer in intimate heat exchange relation with said layer and an ionization gauge mounted in adjacent spaced relation within said envelope, means to vary the temperature of said metal support and of said layer as a function of time, and means to record variations of pressure in said envelope as measurel by said gauge as a function of the temperature of said layer.

2. Apparatus for identification of constituents of a gaseous substance, comprising an envelope for containing a sample of said substance, an opening in said envelope for admitting said sample in rarefied form, an ionization gauge mounted in said envelope for measuring gas pressure and for continuously decreasing chamber pressure by pumping gas therefrom, an adsorber porous solid formed as a thin layer permeable to said gaseous substance and having a structure in the form of a three-dimensional lattice of regularly spaced voids interconnected by passages, the dimensions of said voids and passages ranging upwards from a dimension significantly larger than an atomic dimension of said substance, said solid layer having the property of adsorbing a film of said constituents on its internal surfaces at temperatures below a predetermined temperature and of selectively evolving constituents from its surface as its temperature is raised, means for varying the temperature of said layer as a function of time through a range extending from a lower temperature lying below said predetermined temperature to a higher temperature at which said film is no longer retained, and means to record the variations of gas pressure corresponding to said variation of layer temperature.

3. The apparatus claimed in claim 2 wherein said layer comprises a deposit of particles of a synthetic zeolite having dimensions of said voids and passages substantially uniform.

4. The apparatus claimed in claim 2 wherein said layer comprises a deposit of particles of amorphous carbon formed as a compacted and sintered layer.

5. The apparatus claimed in claim 2 wherein said layer comprises sintered metal oxide particles.

6. The apparatus claimed in claim 2 wherein said layer comprises compacted and sintered finely divided particles of a refractory metal.

7. The apparatus claimed in claim 3 wherein said layer is supported on a metal substrate in intimate heat exchange relation therewith and wherein said means for varying the temprature of said layer comprises means for passing an electrical current through said substrate to heat it.

8. Apparatus for the identification of constituents of a gas comprising an analysis chamber, means for admitting a sample of said gas to said chamber, means to rarefy said gas, a composite body mounted in said chamber, comprising a metal resistive element having a deposit of a porous solid material adhered thereto as a layer about 0.1 mm. thick, said layer being permeable to said gas and comprised of a homogenous substance of open structure having voids and interconnecting passages linking said voids, said material having the property of adsorbing said gas at temperatures below a predetermined temperature on its surfaces and of desorbing gas constituents selectively on rise of temperature of said material above said predetermined temperature, means to measure total gas pressure or partial gas pressure, means to vary the temperature of said layer and of said substrate substantially equally, and means to record gas pressure as a function of said layer temperature.

9. Apparatus as claimed in claim 8 wherein said composite body is of strip form and said porous material is a zeolite in finely divided particulate form the particles of which are partly embedded in a bonding intermediate film.

10. Apparatus as claimed in claim 8 wherein said composite body comprises a sintered metal layer bonded to said metal resistive element, said layer being formed of finely divided particles of a refractory metal.

11. Apparatus as claimed in claim 8 wherein said composite body comprises a compacted porous carbon mass formed of particles ranging from about 0.001 to about 0.1 microns.

12. Apparatus as claimed in claim 8 wherein said composite body comprises a sintered layer of aluminum oxide particles.

13. An article for use in desorption spectrography comprising a metal substrate and a deposit of a porous solid adhered thereto in intimate heat exchange relation, said porous solid being formed as a deposit of zeolite granules partly embedded in a cured bonded resin film.

References Cited by the Examiner

UNITED STATES PATENTS

| | | | |
|---|---|---|---|
| 2,413,565 | 12/46 | Hewlett | 73—29 |
| 2,804,406 | 8/57 | Yntema. | |
| 3,068,402 | 12/62 | Redhead | 73—23 |
| 3,077,712 | 2/63 | Milleron et al. | 55—387 |

RICHARD C. QUEISSER, *Primary Examiner.*

JOSEPH P. STRIZAK, *Examiner.*